United States Patent Office 3,321,276
Patented May 23, 1967

3,321,276
PREPARATION OF SILICA GEL
Alfred J. Burzynski and Robert E. Martin, Toledo, Ohio, assignors to Owens-Illinois, Inc., a corporation of Ohio
No Drawing. Filed Oct. 23, 1965, Ser. No. 504,202
6 Claims. (Cl. 23—182)

This invention relates to a method for preparing solid silica gel in substantially spherical bead form, i.e., in the form of a number of small bodies each having a somewhat rounded surface and thus having the general appearance of a sphere and preferably in the form of beads having a good spherical shape. In a more specific aspect, the invention relates to a method for hydrolyzing ethyl orthosilicate to particles, i.e., beads, of solid silica gel that are spherical or substantially spherical.

It is known to prepare silica gel adsorbents and silica gel containing other oxides such as alumina as catalysts in discrete substantially spherical form. The known methods, however, generally involve forming a hydrogel of silica or silica-alumina or the like by adjusting the pH of a sodium silicate solution to obtain a hydrogel with a limited setting time, and thereafter dispersing droplets of the hydrogel by one method or another in an immiscible liquid until the hydrogel particles have set to a solid gel. The methods of subdividing the hydrogel into droplets are involved and entail careful control and special equipment and the hydrogel must be carefully purified to remove the immiscible liquid and other impurities. Another method for making spherical silica gel or silica-containing catalysts involves spray-drying of hydrogels.

It is an object of the present invention to provide a simple and improved process for preparing silica gel, which may contain other metal oxides, as substantially spherical particles and with a narrow distribution of size ranges. Other objects, as well as aspects and advantages, of the invention will be apparent from the specification to follow.

The method of the present invention comprises dissolving and hydrolyzing ethyl orthosilicate in water having a pH at least as low as 1 and containing an emulsifying agent and agitating and heating the solution until immiscible droplets are formed and continuing agitation until immiscible droplets harden to solid silica gel in the presence of an added ionizable acid-soluble inorganic salt. More specifically, the invention is a method of preparing solid, hard, substantially spherical beads comprising a gel of silica which consists essentially of forming a mixture consisting essentially of ethyl orthosilicate, water in a volume ratio of water to ethyl orthosilicate of at least 2, a strong mineral acid, other than such acid that is reactive with said silica, in said water in an amount sufficient to provide said water with a maximum pH of 1, and a sufficient amount of a material capable of functioning as an emulsifying agent in the presence of water having said pH value, agitating the mixture at suitable time and temperature until the mixture becomes a single clear phase as a solution, adding to the solution a water-soluble inorganic metal salt capable in sufficient amount of increasing the ionic strength of said water, continuing the agitation until dispersed oily droplets separate from the solution, providing further agitation of the mixture until said droplets harden to form said solid beads, and separating said solid beads from said mixture, said addition of the ionizable salt being made in an amount sufficient to provide hardening of said droplets between the time of formation of the clear solution and the completion of said further agitation whereby the presence of said salt during said further agitation assists in the hardening of the droplets to form said solid beads.

Although fairly rounded particles of silica gel can be formed at pH values as high as 2 or 3, it has been found necessary for good results to maintain a pH at least as low as 1. It has also been found essential to add an ionizable salt, such as sodium chloride, sodium sulfate, potassium chloride, potassium sulfate, sodium nitrate, potassium nitrate, sodium phosphate or potassium phosphate, to the solution before the beads can be made to harden. It is believed that the hardening effect is obtained by the fact that the ionic strength of the solution is increased. The salt can be added at any stage, but must be present before the droplets will harden. The low pH can be provided by a strong mineral acid, e.g., sulfuric acid, hydrochloric acid and nitric acid, i.e., a strong mineral acid other than such acid that is reactive with said silica.

After the beads are formed and hardened, they can be separated from the reaction mixture and dried directly. However, for most uses it is desirable to wash the beads to remove the salts and at least most of the emulsifier. The washing steps can be conventional and water can be employed. Also, when the salt is a sodium salt, it is advantageous to employ an ammonia-water wash since the ammonia tends to replace sodium and the ammonia is easily removed.

The silica gel particles can be impregnated with salts of solutions of catalytically active metals, such as aluminum and the like, by methods well-known in the art. Thus, the beads can be soaked in an aluminum-sulfate solution, drained, and treated with an ammonium hydroxide solution to precipitate alumina, and thereafter washed.

The size of the silica gel beads produced by the present process is generally 1 mm. or less, usually in the range from about 1 micron to 1 mm., with a narrow range of particle sizes. The narrow particle size distribution resulting from the present method is a distinct advantage over prior art methods. The particle size of the spherical beads is affected by the variables of the process. Major factors include water content, amount of emulsifier, and agitation, and increasing any of these usually decreases the particle size. While somewhat rounded beads can be obtained employing about 2 volumes of water per volume of ethyl orthosilicate, best results are obtained when at least 2½ volumes of water per volume of ethyl orthosilicate are employed and it is preferred to have at least 5 volumes of water present in the reaction mixture per volume of ethyl orthosilicate.

The amount of emulsifier used varies with the particular emulsifier, the amount of water, etc., and is best determined empirically in any given case by routine test. Of course, enough emulsifier is employed to cause the formation of the spherical oily droplets and to protect the droplets during hardening so that they do not agglomerate to form irregular gel particles. Usually at least 5 grams of emulsifier per 400 ml. of water have been used. The emulsifying agent employed is, of course, a water-dispersible type effective under the acidic conditions employed in the process. Thus, the two main types of emulsifiers employed are the organic nonionic emulsifiers and the organic cationic emulsifiers. Of course, fatty acid soaps are ineffective under the acid conditions.

Some useful emulsifiers which can be mentioned by way of example are polyethylene glycol lauryl ether; the condensation products of an alkylene oxide with alcohols, mercaptans, or phenols, such as the condensation product of ethylene glycol with butylphenol or with diisobutylphenol, the condensation product of n-dodecylmercaptan with ethylene oxide, the Tweens such as tris (polyoxyethylene) sorbitan; the Pluronics, which are block polymers of polypropylene glycol chains and polyethylene glycol chains with a molecular weight of at least about 2000, with about equal portions of the molecular weight in the polypropylene glycol and polyethylene glycol portions; cetyldimethylethylammonium bromide, cetyldimethylbenzylammonium chloride, $$[CH_3(CH_2)_{14}CH_2N^+(CH_3)_2CH_2C_6H_4]Cl^-$$

and the nonylphenyl ether of polyethylene glycol (condensation product of nonylphenol with several mols of ethylene oxide).

The following examples are illustrative of the invention but are not to be considered as limiting thereof.

*Example I*

A mixture of 400 ml. of water, 10 grams of a nonionic emulsifier, the nonylphenyl ether of polyethylene glycol (Tergitol NPX), having a specific gravity of 1.063 (20/20° C.), and 40 ml. of ethyl orthosilicate was made up. This was a two-phase system. Then 30 ml. of 6-normal sulfuric acid were added and agitation was started. The mixture was heated with stirring and at about 35° C. the solution cleared. Slow heating was continued with continued agitation and at about 70° C. a haze developed and at 83° C. there was a sudden flash to a very cloudy mixture. Heating was continued for 15 minutes in the range of 85–90° C. and then about 5 grams of sodium chloride were added. After 12 minutes very small silica gel particles formed. The solid silica gel particles were filtered from the reaction mixture and washed several times with water and acetone and then dried. The average particle size of the spheres was about 0.1 mm.

*Example II*

Example I was repeated except that 1 gram of Baker's finely-divided ignited alumina was added after the solution had cleared. The resulting beads were spherical beads of silica gel and were about 0.1 mm. in diameter, and analysis showed that the alumina content was about 12 weight percent of the silica. The dried beads were heated to 430° C. without any apparent change or effect.

*Example III*

A mixture of 75 ml. of water, 10 grams of the nonionic detergent of Example I, and 40 ml. of ethyl orthosilicate was made up and the pH was adjusted to about 2 by adding 1-normal HCl. The resulting cloudy mixture cleared with agitation and heating to about 60° C. Agitation and heating were continued and a haze developed at 80° C. and after about 5 minutes at this temperature the mixture became very milky and about 4 grams of sodium chloride were added and oily droplets formed and hardened after about 10 minutes with continued agitation. The beads formed were generally spherical but were a very poor spherical shape compared with the beads of Example I.

When the foregoing experiment is repeated but using a pH of less than 1, better quality spherical silica beads are formed. When the amount of water is also increased, the quality of the beads is further improved.

*Example IV*

Example I was repeated except that dilute sulfuric acid was used for acidification to about pH 3 and about 30 grams of sodium chloride were used to promote the formation of the substantially spherical beads. The silica gel beads formed were substantially spherical but were not of as good spherical quality as Example I, wherein the pH was well below 1.

The hydrolysis or clearing step can be effected at room temperature, but is hastened if heat is applied. Generally, this step is effected in the temperature range from 30° to 65° C. The droplet forming and hardening steps are usually effected at about 70–95° C., although lower temperatures can be employed is sufficient time is used.

The amount of salt employed is usually at least 0.1 gram per 100 grams of water in the reaction mixture, most often at least 0.5 gram per 100 grams of water.

In addition to the well-known uses of silica gel, such as solid adsorbents and catalyst bases, the beads of the invention are useful as refractory fillers in plastics, including polyethylene and alkyd resins. They will adsorb dyes and can be used to impart color to plastics. The more finely-divided beads are also useful as pigments in oil and water-based paints.

Fluorescent dyes can be adsorbed on the surfaces of the beads and can be embedded in clear plastic surface coatings to make fluorescent signs and decorative coatings.

As will be evident to those skilled in the art, various modifications of this invention can be made or followed in the light of the foregoing disclosure and discussion without departing from the spirit and scope of the disclosure or from the scope of the claims.

We claim:
1. A method of preparing solid, hard, substantially spherical beads comprising a gel of silica which consists essentially of the steps of:
   (1) forming a mixture consisting essentially of ethyl orthosilicate, water in a volume ratio of water to ethyl orthosilicate of at least 2, a strong mineral acid, other than such acid that is reactive with said silica, in said water in an amount sufficient to provide said water with a maximum pH of 1, and a sufficient amount of a material capable of functioning as an emulsifying agent in the presence of water having said pH value;
   (2) agitating the mixture at suitable time and temperature until the mixture becomes a single clear phase as a solution;
   (3) adding to the solution a water-soluble inorganic metal salt capable in sufficient amount of increasing the ionic strength of said water;
   (4) continuing the agitation until dispersed oily droplets separate from the solution;
   (5) providing further agitation of the mixture until said droplets harden to form said solid beads; and
   (6) separating said solid beads from said mixture, said addition of the ionizable salt being made in an amount sufficient to provide hardening of said droplets between the time of formation of the clear solution and the completion of said further agitation whereby the presence of said salt during said further agitation assists in the hardening of the droplets to form said solid beads.

2. The method of claim 1 wherein said volume ratio of water to ethyl orthosilicate is at least 2½ and wherein the ionizable metal salt is at least one salt selected from the group consisting of sodium chloride, sodium sulfate, potassium chloride, potassium sulfate, sodium nitrate, potassium nitrate, sodium phosphate and potassium phosphate.

3. The method of claim 2 wherein the material capable of functioning as an emulsifying agent is selected from the group consisting of organic nonionic emulsifiers and organic cationic emulsifiers.

4. The method of claim 3 wherein said volume ratio is at least 5 and wherein the material capable of functioning as an emulsifying agent is nonylphenyl ether of polyethylene glycol.

5. The method of claim 4 wherein the ionizable salt is added in an amount of at least 0.1 gram per 100 grams of water.

6. A method of preparing solid, hard, substantially spherical beads comprising a gel of silica which consists essentially of the steps of:
   (1) mixing ethyl orthosilicate, water in a volume ratio of water to ethyl orthosilicate of 10, 6-normal sulfuric acid in a volume ratio of water to said sulfuric acid of 40:3, and nonylphenyl ether of polyethylene glycol in a weight ratio of said water to said glycol ether of 40;

(2) agitating the mixture while heating the mixture up to and at about 35° C. until the mixture becomes clear solution;

(3) continuing agitation while providing further heating up to an elevated temperature of 85° C. to 90° C.;

(4) continuing the agitation at said elevated temperature for 15 minutes;

(5) adding sodium chloride in a weight amount that is ½ of the weight of the glycol ether;

(6) further agitating the mixture until solid hard beads are formed; and (7) separating the beads from the balance of the mixture by filtration.

References Cited by the Examiner

UNITED STATES PATENTS 3,245,918   4/1966   Burzynski _____ 23—182 X

OSCAR R. VERTIZ, *Primary Examiner.*

A. GREIF, *Assistant Examiner.*